No. 870,242. PATENTED NOV. 5, 1907.
A. H. MEECH.
CABLE CLAMP.
APPLICATION FILED OCT. 1, 1906.
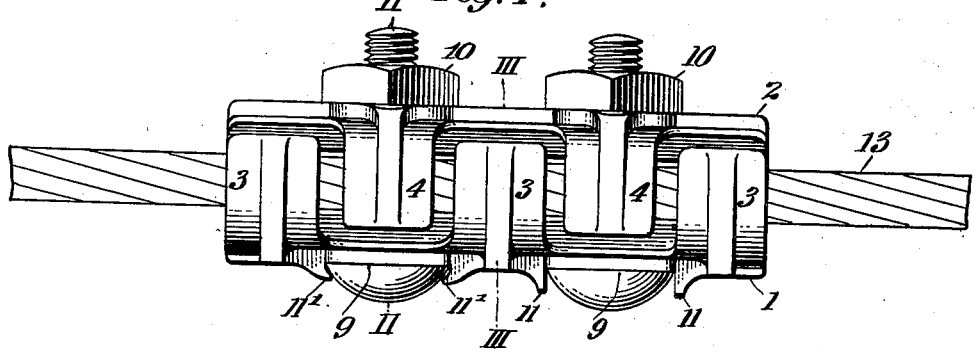
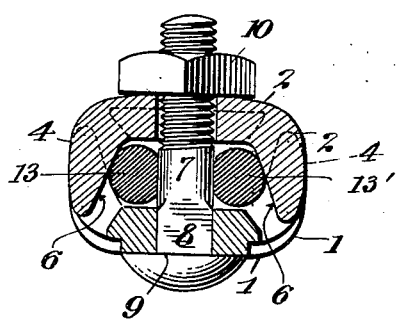
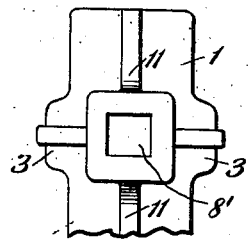
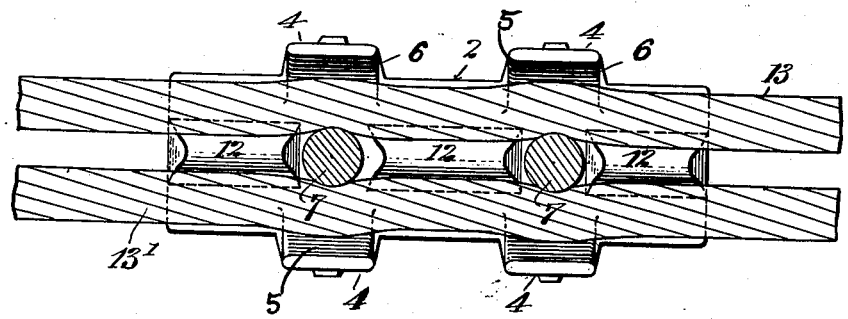
Witnesses
Inventor
Alfred H. Meech
By his Attorneys

UNITED STATES PATENT OFFICE.

ALFRED H. MEECH, OF CHATHAM, NEW YORK.

CABLE-CLAMP.

No. 870,242.   Specification of Letters Patent.   Patented Nov. 5, 1907.

Application filed October 1, 1906. Serial No. 336,867.

*To all whom it may concern:*

Be it known that I, ALFRED H. MEECH, a citizen of the United States, residing at Chatham, in the county of Columbia and State of New York, have invented certain new and useful Improvements in Cable-Clamps, of which the following is a full, clear, and exact description.

My invention relates to wire or fibrous rope and cable clamps, the principal object being to provide a simple two-part clamp capable of joining a pair of cable ends together with great security.

The clamp is designed to be applicable to any size of rope or cable by being manufactured in varying sizes, each of which is capable of accommodating different diameters of ropes or cables within certain limits, that is to say, not larger or smaller than certain limiting sizes or diameters. The clamp is used for splicing together the ends of separate ropes or cables, or making a loop or thimble end as desired.

In my companion application, Serial No. 305,767, I have described and claimed in its broad aspects a cable clamp having the general features of the present case. The present application relates to minor features of improvement, particularly the provision of additional abutments between the bolts which are used for holding the members of the clamp together, and in having the bolts permanently secured to one of the members, so as to save trouble and time when the clamp is assembled upon a cable.

In the drawings: Figure 1 is a side view showing a clamp embodying the principles of my invention in place upon a cable; Fig. 2 is a sectional view of the same on the line II—II of Fig. 1; Fig. 3 is a sectional view on the line III—III of Fig. 1; Fig. 4 is a view looking up into the upper member of the clamp and showing a pair of cables placed therein. Fig. 5 is a fragmentary view illustrating the shape of the opening through which the clamping bolt or bolts pass.

The essential principle of which I make use and which is fully described in my companion case above referred to, depends upon having the clamping members forced into clamping relation so as to engage the cables by inclined or wedge faces, which are provided on projecting legs of the members for this purpose. The legs of each member fit between one another, each over-lapping the other member, allowing a considerable amount of movement toward one another. The legs act on the cables to clamp or bite the same in a series of spaced transverse planes, and furthermore deflect or bend the cables between such planes. By the term bite I mean the action where two jaws or members come together to clamp, press upon or indent an article with very great force throughout a limited area thereof. The effect of both bending and engaging the cable with a biting engagement as above defined is to insure a very high degree of clamping efficiency there-on. The above result is furthermore accomplished merely by forcing the two members of the clamp upon the cable elements, which are merely laid between the members for this purpose.

Referring to the drawing in which like parts are designated by the same reference sign, 1 and 2 indicate the two members of a two-part cable clamp, which respectively have lateral legs 3 and 4. The members are positioned to be guided in clamping relation, so that the legs 3 lie in transverse planes which are intermediate the transverse planes occupied by the legs 4 of the other member. In other words, the legs 3 and 4 lie in alternate spaced transverse planes along the length of the cables to be clamped. The inside faces of both the legs 3 and 4 are inclined so that such faces lie in divergent planes. The inside faces of the legs 4 are designated at 5 (see Figs. 3 and 4), and it will be observed that these faces lie in divergent planes flaring upwardly. The inside faces of the legs 3 are correspondingly inclined to one another and lie in divergent planes flaring downwardly. The outside of these legs may be ribbed if desired to impart greater strength. The features thus far described are substantially similar to those of my above mentioned application, and form no part of the present invention.

Instead of ordinary bolts passed through alined round holes in the two members, I make use of special bolts 7, having a square or irregularly shaped shank 8 near the head end to coöperate with correspondingly shaped holes in the lower member 1 and keep the bolts from turning when the nuts are tightened. The form of the head is also changed, being made round with a thin outside edge 9. 10 denotes the usual nuts by which the members are clamped together.

The thin edges 9 of the heads of the nuts have a special purpose and coöperate with certain lugs on the lower clamping member to hold the bolts permanently therein. Referring particularly to Fig. 1 it will be seen that the back of the member 1 has projecting lugs 11 adjacent to the heads of the bolts, and these lugs may be hammered down and bent over, as at 11′, so as to engage the edge 9 of the bolt heads, and permanently secure the bolts in place.

The bolts 7 constitute abutments against which the cables bear when pressed inward by the wedging action of the inclined faces 5 and 6. I also provide additional abutments 12 formed by making ridges or projections longitudinally upon the inside surfaces of the upper member 2. These ridges or projections are interrupted at points corresponding to the position of the various bolts. In the structure shown, the ridges have been placed on the upper member and the bolts permanently fixed to the lower member by the lugs 11, but this particular relation is, of course, not absolutely essential.

The use and operation is as follows: A pair of cable elements 13, 13', which may be different parts of the same cable or the ends of separate cables, are laid within the lower member 1 inside the faces 5. The upper clamping member 2 is then placed over the bolts in which relation the pairs of legs 4 will fall in transverse planes between the transverse planes of the legs 3 of the other member. When the two members are tightened together by screwing up the nuts 10, the cable elements 13, 13', will be borne inward against the bolts 7 and also against the abutments 12. In practice the cable elements are deflected about the bolts 7, about as shown in Fig. 4 until they finally abut solidly against the intervening projections 12, whereupon they will be solidly clamped at planes corresponding to the bolts, and between the bolts.

What I claim, is:—

1. In a cable clamp, a pair of members each having legs with inside inclined faces one of said members having square holes of uniform transverse section, bolts having square shanks contained in said holes, said bolts having heads with rounded upper faces, flat under faces and thin peripheral edges, and means on the member engaging said edges for holding the bolts thereto said bolts being adapted to be positioned between the cables to be clamped to engage said cables whereby they constitute abutments for the cables when the members are drawn together.

2. In a cable clamp, a pair of members each having legs with inside inclined faces, bolts for drawing said members together, and ridges or projections on one of the members acting in conjunction with said bolts to form abutments for the cable to be clamped.

3. In a cable clamp, a member having legs with inside divergent faces, a second member also having legs and abutments integral with said member and coöperating with said faces to clamp a cable, and means for drawing said members toward one another.

In witness whereof, I subscribe my signature, in the presence of two witnesses.

ALFRED H. MEECH.

Witnesses:
FRANK S. OBER,
WALDO M. CHAPIN.